US012757044B2

(12) United States Patent
Kim et al.

(10) Patent No.: US 12,757,044 B2
(45) **Date of Patent: *Oct. 6, 2026**

(54) APPARATUS AND METHOD FOR PERFORMING SESSION MANAGEMENT EVENT EXPOSURE SERVICE FOR USER DATA MONITORING IN WIRELESS COMMUNICATION SYSTEM

(71) Applicant: Electronics and Telecommunications Research Institute, Daejeon (KR)

(72) Inventors: Changki Kim, Daejeon (KR); Jeoung Lak Ha, Daejeon (KR); Yoo Hwa Kang, Daejeon (KR); Kyung Soo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 359 days.

This patent is subject to a terminal disclaimer.

(21) Appl. No.: 18/480,727

(22) Filed: Oct. 4, 2023

(65) Prior Publication Data

US 2024/0236730 A1 Jul. 11, 2024

(30) Foreign Application Priority Data

Jan. 6, 2023 (KR) ........................ 10-2023-0002412
Jan. 9, 2023 (KR) ........................ 10-2023-0003114
Jul. 28, 2023 (KR) ........................ 10-2023-0098827

(51) Int. Cl.
*H04W 24/10* (2009.01)
*H04W 24/08* (2009.01)
*H04W 76/11* (2018.01)

(52) U.S. Cl.
CPC ........... *H04W 24/08* (2013.01); *H04W 24/10* (2013.01); *H04W 76/11* (2018.02)

(58) Field of Classification Search
CPC ......... H04W 20/10; H04L 12/28; H04L 12/50
USPC ................................ 370/329, 401, 402, 405
See application file for complete search history.

(56) References Cited

U.S. PATENT DOCUMENTS 10,303,468 B2 5/2019 Kim et al.
10,484,907 B2 11/2019 Song et al.
2021/0281658 A1 9/2021 Kweon et al.
2023/0361901 A1* 11/2023 Kim .................... H04L 12/1407

FOREIGN PATENT DOCUMENTS

EP 3829142 A1 * 6/2021 ......... H04L 61/2503
KR 10-2021-0112868 A 9/2021

OTHER PUBLICATIONS

3rd Generation Partnership Project; Technical Specification Grout Services and System Aspects; Procedures for the 5G System (5GS); Stage 2 3GPP TS 23.502 V18.0.0. Dec. 21, 2022 (pp. 1-773).

(Continued)

*Primary Examiner* — Dang T Ton
(74) *Attorney, Agent, or Firm* — NSIP Law

(57) ABSTRACT

The present disclosure relates generally to a wireless communication system. More particularly, the present disclosure relates to an apparatus and a method for performing a session management event exposure service for user data monitoring in a wireless communication system.

19 Claims, 8 Drawing Sheets

(56) References Cited

OTHER PUBLICATIONS

3GPP, TS23.501 v18.0.0, 3rd Generation Partnership Project; Technical Specification Group Services and System Aspects; System architecture for the 5G System (5GS); Stage 2, Dec. 21, 2022. (pp. 1-585).

Korean Office Action issued on Apr. 15, 2026, in counterpart Korean Patent Application No. 10-2023-0098827.

* cited by examiner

FIG. 2A (a) Event Filters

Table 5.2.8.3.1-1: Example of Event Filters for SMF exposure events

| Event ID for SMF exposure | Event Filter (List of Parameter Values to Match) |
|---|---|
| DNAI Change | None |
| PDU Session Release | <Parameter Type = S-NSSAI, Value = S-NSSAI1> |
| PDU Session Establishment | <Parameter Type = S-NSSAI, Value = S-NSSAI1> |
| QoS Monitoring for URLLC | None |
| QFI allocation | <Parameter Type = DNN, Value = DNN1><br><Parameter Type = S-NSSAI, Value = S-NSSAI1> |
| QFI allocation | <Parameter Type = Application Identifier, Value = Application Identifier1> |
| Transaction Count | <Parameter Type = TAI, Value = TA1> (NOTE)<br><Parameter Type = S-NSSAI, Value = S-NSSAI1> |
| ...... | |

(b)Nsmf_EventExposlure_Subscriber Service Operation

Service operation name: Nsmf_EventExposure_Subscribe.

Description: This service operation is used by an NF to subscribe or modify a subscription for event notifications on a specified PDU Session or for all PDU Sessions of one UE, group of UE(s) or any UE.

Input, Required: NF ID, Target of Event Reporting as defined in clause 5.2.8.3.1, (set of) Event ID(s) defined in clause 5.2.8.3.1, Notification Target Address (+ Notification Correlation ID), Event Reporting Information defined in Table 4.15.1-1.

Input, Optional: Event Filter(s) associated with each Event ID; Event Filter(s) are defined in clause 5.2.8.3.1, Subscription Correlation ID (in the case of modification of the event subscription), Expiry time, DNN, S-NSSAI.

Output, Required: When the subscription is accepted: Subscription Correlation ID (required for management of this subscription), Expiry time (required if the subscription can be expired based on the operator's policy).

Output, Optional: First corresponding event report is included, if available (see clause 4.15.1).

Notification Target Address (+ Notification Correlation ID) is used to correlate Notifications sent by SMF with this subscription

FIG. 2B

FIG. 3A (a) Table 5.2.8.3.1-1: Example of Event Filters for SMF exposure events

| Event ID for SMF exposure | Event Filter (List of Parameter Values to Match) |
|---|---|
| DNAI Change | None |
| PDU Session Release | <Parameter Type = S-NSSAI, Value = S-NSSAI1> |
| PDU Session Establishment | <Parameter Type = S-NSSAI, Value = S-NSSAI1> |
| QoS Monitoring | <Parameter Type = DNN, Value = DNN1><br><Parameter Type = S-NSSAI, Value = S-NSSAI1><br><Parameter Type = Application Identifier, Value = Application Identifier1><br><Parameter Type = Monitoring Type_Delay, Value = UL and/or DL Delay ><br><Parameter Type = Monitoring Type_Bandwidth = Value=UL and/or DL Bandwidth><br><Parameter Type = Flow Info, Value = IP Filter Set1><br><Parameter Type = Flow Info, Value = Ethernet Filter Set1><br><Parameter Type = Packet numbers, Value = Transmission packet or Retransmission packet> |
| QFI allocation | <Parameter Type = DNN, Value = DNN1><br><Parameter Type = S-NSSAI, Value = S-NSSAI1> |
| QFI allocation | <Parameter Type = Application Identifier, Value = Application Identifier1> |
| Transaction Count | <Parameter Type = TAI, Value = TA1> (NOTE)<br><Parameter Type = S-NSSAI, Value = S-NSSAI1> |
| User plane status information | <Parameter Type = Application Identifier, Value = Application Identifier1><br><Parameter Type = SUPI, Value = SUPI1> |
| UPF Event Exposure Capability <UserDataUsageMeasure, UserDataUsage Trend> | <Parameter Type = S-NSSAI, Value = S-NSSAI1><br><Parameter Type = DNN, Value = DNN1><br><Parameter Type = Application Identifier, Value = Application Identifier1><br><Parameter Type = Flow Info, Value = Packet Filter Set1><br><Parameter Type = AoI, value = AoI1><br><Parameter Type = SSID/BSSID, Value = SSID/BSSID1> |

FIG. 3B (b) Nsmf_EventExposlure_Subscriber Service Operation

Service operation name: Nsmf_EventExposure_Subscribe.

Description: This service operation is used by an NF to subscribe or modify a subscription for event notifications on a specified PDU Session or for all PDU Sessions of one UE, group of UE(s) or any UE.

Input, Required: NF ID, Target of Event Reporting as defined in clause 5.2.8.3.1, (set of) Event ID(s) defined in clause 5.2.8.3.1, Notification Target Address (+ Notification Correlation ID), Event Reporting Information defined in Table 4.15.1-1.

Input, Optional: Event Filter(s) associated with each Event ID; Event Filter(s) are defined in clause 5.2.8.3.1, Subscription Correlation ID (in the case of modification of the event subscription), Expiry time, DNN, S-NSSAI, UPF data subscription information, Direct Notification Indication.

Output, Required: When the subscription is accepted: Subscription Correlation ID (required for management of this subscription), Expiry time (required if the subscription can be expired based on the operator's policy).

Output, Optional: First corresponding event report is included, if available (see clause 4.15.1).

Notification Target Address (+ Notification Correlation ID) is used to correlate Notifications SMF or UPF with this subscription.

FIG. 3C (c) UPF data subscription information

| **Event ID**(NOTE1) | **Subscription item** (NOTE1) | **Event Consumer** |
|---|---|---|
| QoS monitoring | Delay measurement (UL/DL/RTT) | NWDAF |
| | Bandwidth measurement (UL/DL) | |
| | Packet drop rate (UL/DL) | |
| | Packet transmission number (UL/DL) | |
| UserDataUsageMeasure | Volume Measurement (data volume (UL/DL/overall), and number of packets exchanged (UL/DL/overall)) | |
| | Throughput measure(UL/DL) | |
| UserDataUsageTrend | Throughput statistical measurement (average /peak throughput) | |
| NOTE: The corresponding subscription item associated with each Event ID may be added as the Input parameter from the event consumer([ex] NWDAF) in the Nsmf_EventExposure_Subscribe Service Operation. | | |

APPARATUS AND METHOD FOR PERFORMING SESSION MANAGEMENT EVENT EXPOSURE SERVICE FOR USER DATA MONITORING IN WIRELESS COMMUNICATION SYSTEM

CROSS REFERENCE TO RELATED APPLICATION

The present application claims priority to Korean Patent Application Nos. 10-2023-0002412, 10-2023-0003114 and 10-2023-0098827, filed Jan. 6, 2023, Jan. 9, 2023, and Jul. 28, 2023, respectively, the entire contents of which are incorporated herein for all purposes by this reference.

BACKGROUND OF THE INVENTION

Field of the Invention

The present disclosure relates generally to a wireless communication system. More particularly, the present disclosure relates to an apparatus and a method for performing a session management event exposure service for user data monitoring in a wireless communication system.

Description of the Related Art

A 5G system is a mobile communication system composed of a 5G radio access network (RAN) and a 5G core network (CN). A control plane (CP) of the 5G core network is standardized as service based architecture (SBA), and network functions (NFs) interact through a service based interface (SBI). User data monitoring is a process of evaluating and improving quality of service (QoS) by measuring and analyzing the delay, loss, error, and bandwidth of data packets in a network. In general, a 5G system may include a process in which a control plane NF subscribes user data monitoring events to a user plane NF, and a process in which the user plane NF notifies the control plane NF of event results.

3GPP Rel-18 additionally defines functions for supporting the performance improvement, new use cases and vertical industries of a 5G system. In particular, a user plane function (UPF) is included in the SBA structure of the control plane, and through this, an UPF event exposure service that informs a control plane NF of event results occurred in the UPF is provided.

SUMMARY OF THE INVENTION

On the basis of the above discussion, the present disclosure provides an apparatus and a method for performing a session management event exposure service so that a control plane (CP) network function (NF) monitors user data packets from a user plane function (UPF) in a wireless communication system.

In addition, the present disclosure provides the procedure of an indirect UPF event subscription to the user plane function (UPF) via a session management function (SMF) so that a network data analysis function (NWDAF) performs user data monitoring.

In addition, the present disclosure provides a procedure for the UPF to directly transmitting event results to the NWDAF through a UPF event exposure service interface when the event occurs.

In addition, the present disclosure provides event filters and parameters applied to user data monitoring events supported by an SMF event exposure service.

In order to achieve the above objectives, according to various embodiments of the present disclosure, there is provided a method performed by a session management function (SMF) for providing an UPF event exposure service for user data monitoring in a wireless communication system, the method comprising: receiving a UPF event subscription request from network data analytics function (NWDAF) including at least one of an event ID, an event filter information applied to the event, UPF data subscription information, or control information for directly transmitting event results to the NWDAF through a service based interface (SBI); regenerating the UPF event subscription message or service operation on a basis of the event ID, the event filter information, the UPF data subscription information, and the control information; and transmitting the regenerated UPF event subscription message or service operation to the UPF through an N4 interface or an Nupf_EventExposure service interface.

According to various embodiments of the present disclosure, there is provided the SMF for providing an UPF event exposure service for user data monitoring in a wireless communication system, the SMF including: a transceiver, and a control part operably connected to the transceiver, wherein the control part receives the UPF event subscription request from NWDAF including at least one of an event ID, an event filter information applied to the event, UPF data subscription information, or control information for directly transmitting event results to NWDAF through SBI; regenerates the UPF event subscription message or service operation on a basis of the event ID, the event filter information, the UPF data subscription information, and the control information; and transmits the regenerated UPF event subscription message or service operation through the N4 interface or the Nupf_EventExposure service interface to the UPF.

According to various embodiments of the present disclosure, there is provided a method performed by user plane function (UPF) for providing an UPF event exposure service for user data monitoring in a wireless communication system, the method comprising: receiving the UPF event subscription message from SMF through the N4 interface or the Nupf_EventExposure service interface, and, directly transmitting the event results through an Nupf service interface to the NWDAF when the event occurs.

According to various embodiments of the present disclosure, there is provided the UPF for providing an UPF event exposure service for user data monitoring in a wireless communication system, the UPF including: the transceiver; and the control part operably connected to the transceiver, wherein the control part receives the UPF event subscription message or service operation through the N4 interface or the Nupf_EventExposure service interface from the SMF, and directly transmitting event results through the Nupf service interface to the NWDAF when the event occurs.

In apparatus and method according to various embodiments of the present disclosure, a session management event exposure service for user data monitoring is performed in a wireless communication system, thereby evaluating and improving quality of service (QoS) by measuring and analyzing the delay, loss, error, or bandwidth of user data packets in a network.

In addition, in the apparatus and method of the present disclosure, the NWDAF indirectly subscribes a user data monitoring event to the UPF via the SMF, and the UPF directly transmits the event results to the NWDAF through a UPF event exposure service when the event occurs, thereby providing efficient collection and analysis of data for user data monitoring, reducing a load of a control plane, and improving network performance.

In addition, in the apparatus and method of the present disclosure, an event ID and event filters and parameters applied to each event for user data monitoring are provided, thereby enabling UPF to collect and deliver the event result efficiently.

Effects obtainable from the present disclosure are not limited to the effects mentioned above, and other effects not mentioned will be clearly understood by those skilled in the art to which the present disclosure belongs from the description below.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 2A illustrates an example of event IDs supported by an SMF event exposure service and event filters applied to each event according to various embodiments of the present disclosure;

FIG. 2B illustrates an example of input and output parameters of an SMF event exposure service subscription operation according to various embodiments of the present disclosure;

FIG. 3A illustrates an example of an updated event IDs supported by an SMF event exposure service and event filters applied to each event for indirect UPF event subscription according to an embodiment of the present disclosure;

FIG. 3B illustrates an example of updated input and output parameters of an SMF event exposure subscription service operation according to an embodiment of the present disclosure;

FIG. 3C illustrates an example of UPF data subscription information added to the SMF exposure service operation for indirect UPF event subscription according to an embodiment of the present disclosure;

DETAILED DESCRIPTION OF THE INVENTION

Figure 1:
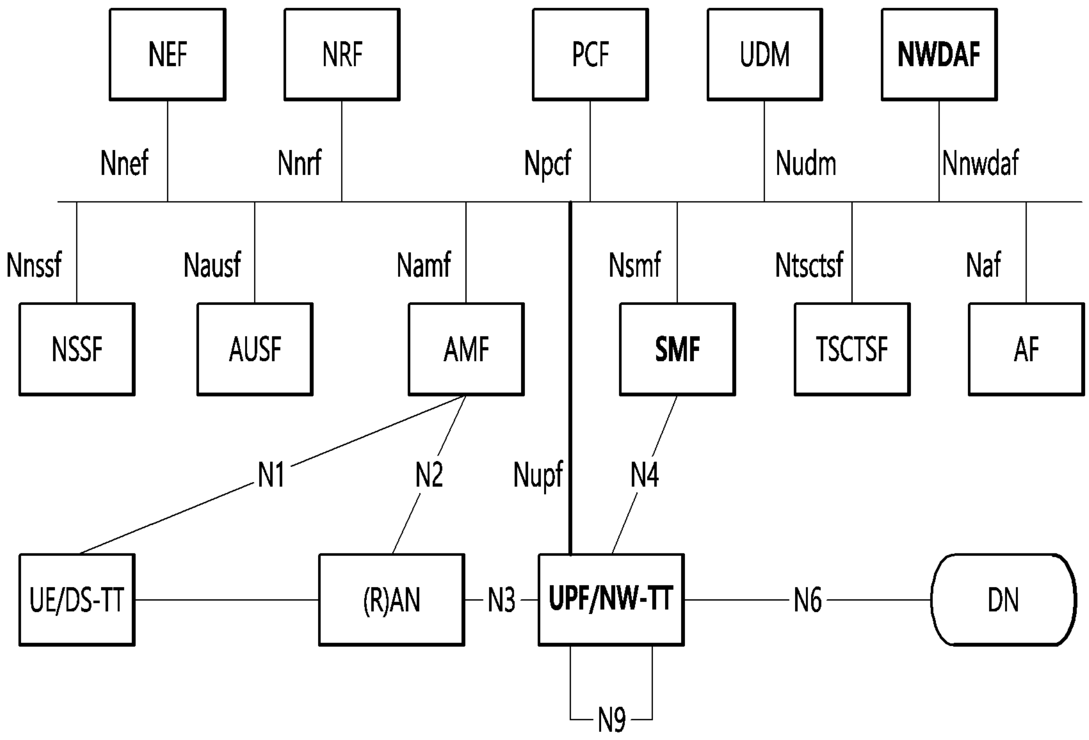
FIG. 1 illustrates an example of a 5G system architecture in which a 5G user plane function (UPF) is included in service based architecture according to various embodiments of the present disclosure.

Terms used in the present disclosure are used only to describe a specific embodiment, and may not be intended to limit the scope of other embodiments. Singular expressions may include plural expressions unless the context clearly dictates otherwise. Terms used herein, including technical or scientific terms, may have the same meaning as commonly understood by those skilled in the art described in the present disclosure. Among terms used in the present disclosure, terms defined in general dictionaries may be interpreted as having the same or similar meanings as those in the context of the related technology, and unless explicitly defined in the present disclosure, should not be interpreted to be ideal or excessively formal. In some cases, terms defined in the present disclosure cannot be interpreted to exclude the embodiments of the present disclosure.

In various embodiments of the present disclosure described below, hardware-based approaches are described as examples. However, since various embodiments of the present disclosure include technology using both hardware and software, the various embodiments of the present disclosure do not exclude software-based approaches.

Hereinafter, the present disclosure relates to an apparatus and a method for performing an SMF event exposure service for user data monitoring in a wireless communication system. Specifically, the present disclosure describes a method which measures and analyzes the delay, loss, error, or bandwidth of data packets to evaluate and improve quality of service (QoS) in a network by performing an SMF event exposure service for the UPF event subscription for user data monitoring in a wireless communication system.

In the following description, terms referring to signals, terms referring to channels, terms referring to control information, terms referring to network entities, and terms referring to components of a device, etc. are used for convenience of description. Accordingly, the present disclosure is not limited to the terms described below, and other terms having equivalent technical meanings may be used.

In addition, although the present disclosure describes various embodiments by using terms used in some communication standards (e.g., 3rd Generation partnership project (3GPP)), this is only examples for description. Various embodiments of the present disclosure may be easily modified and applied to other communication systems.

3GPP SA2, a major organization for mobile communication standardization, completed Rel-17(stage 2) standardization for a 5G system in December 2021. Afterwards, the Rel-18 standardization work began in January 2022, and is currently in progress with the goal of completing the stage 2 standard specification in the first half of 2023. Recently, in Rel-18, a user plane function (UPF), which is a user plane function of a 5G core network, was also included in the service based architecture (SBA) of a control plane.

According to technical report (TR 23.700-62) of UPF enhancement for exposure and SBA (UPEAS) study work (TR23.700-62 v1.1.0), in Rel-18, a UPF was limited to provide only event exposure service through service based interface (SBI). Accordingly, the UPF communicates with the control plane through conventional N4 interface and a new Nupf_EventExposure service interface.

In 3GPP SA2 Rel-17 standard specification, only user data monitoring to UPF in 5GS were QoS monitoring events. In addition, the subscription and result notification of the QoS monitoring events were also performed only through the N4 interface via the SMF and only 'packet delay' measurement item was collected. However, as a UPF service interface (Nupf) was newly created in Rel-18, UPF events and measurement items for user data monitoring were also added. In addition, procedures for the subscription and notification of the user data monitoring events were changed.

In Rel-18, for UPF event subscription and result notification procedures for the user data monitoring (QoS monitoring, UserDataUsageMeasures, and UserDataUsageTrends) between a NWDAF and an UPF, the event is subscribed indirectly to the UPF via SMF, and the event results are directly transmitted, which is more important than the subscription, to the NWDAF through the UPF service interface (Nupf_EventExposureNotify) without going through the SMF.

For this purpose, the present disclosure provides a control method and apparatus based on the Nsmf_EventExposure service between the NWDAF and the SMF to support indirect UPF event subscription in event processing procedure for a user data monitoring (Indirect Subscription & Direct Notification) between the NWDAF and UPF in 5GS.

According to the present disclosure, to provide the apparatus and method described above, the NWDAF uses an Nsmf_EventExposure service for the indirect UPF event subscription, and in this case, the NWDAF provides SMF with event ID, event filters, parameters applied to the corresponding UPF event and additional control information for direct transmission of the event result to the NWDAF, As a result user data monitoring between the NWDAF and the UPF can be efficiently performed.

FIG. 1 illustrates an example of a 5G system architecture in which a 5G user plane function (UPF) is included in service based architecture according to various embodiments of the present disclosure.

Referring to FIG. 1, the UPF can be included in the existing SBA architecture, therefore the SMF can be connected to UPF by a SBI (Nupf) and the conventional N4 interface.

FIG. 2A illustrates an example of event IDs supported by an SMF event exposure service and event filters applied to each event according to various embodiments of the present disclosure.

Referring to FIG. 2A, FIG. 2A may illustrate event IDs and event filters applied to each event supported in SMF event exposure service defined in 3GPP SA2 TS23.502 (V18.0.0).

FIG. 2B illustrates an example of input and output parameters of an SMF event exposure service subscription operation according to various embodiments of the present disclosure;

Referring to FIG. 2B, FIG. 2B may be an SMF event exposure service subscription operation defined in the 3GPP SA2 TS23.502 (V18.0.0).

The event IDs may be a mandatory input parameter of the SMF event exposure service operation. The event filters may be an optional input parameter of the SMF event exposure service operation.

event IDs and event filters applied to each corresponding event are defined in FIG. 2A. In a conventional standard specification TS23.502 (V18.0.0), there is no event filter for a QoS monitoring event.

FIG. 3A illustrates an example of updated event IDs supported by SMF event exposure service and event filters applied to each event for indirect UPF event subscription according to an embodiment of the present disclosure.

Referring to FIG. 3A, the event filters for a 'QoS monitoring' event are added when compared with FIG. 2A.

'UserDataUsageMeasures' or 'UserDataUsageTrends' event ID and filters for the corresponding events are also added. At least one filter condition for each event ID may be included according to the request from NWDAF.

An event filter for a 'QoS monitoring' event may include data network name (DNN), single-network slice selection assistance information(S-NSSAI), an application ID, a monitoring type, QoS flow Information, or packet number, etc. DNN is a data network identifier and is typically in the form of an APN (Access Point Name). S-NSSAI is the identification of a Network Slice and S-NSSAI is made up of two field SST (Slice/Service Type) and SD (Service Differentiator). Application Identifier is an identifier that can be mapped to a specific application traffic detection rule.

The monitoring type may indicate detailed monitoring information of a QoS flow to be monitored. According to one embodiment, the monitoring type may include at least of monitoring type delay indicating the packet delay measurement or monitor type bandwidth indicating bandwidth measurement. The monitoring type delay may include at least one of UL delay, DL delay, or RTT delay. A monitoring type bandwidth may include at least one of a UL bitrate, a DL bitrate, or overall traffic volume. The QoS flow Information may include at least one of an IP filter set or an Ethernet filter set as filter information for the SMF to find a QFI (QoS flow identifier) of a corresponding QoS flow within a specific PDU session. Packet numbers may refer to the number of transmitted or retransmitted packets of the corresponding flow. According to one embodiment, the monitoring type and the packet numbers can be transmitted from the NWDAF to the SMF through separate parameter, not the event filter.

An event filter for a 'UserDataUsageMeasures' or 'UserDataUsageTrends' may include at least one of S-NSSAI, DNN, the application ID, flow information, an area of interest (AoI), or SSID/BSSID.

FIG. 3B illustrates an example of input and output parameters of the SMF event exposure subscription service operation according to an embodiment of the present disclosure.

Referring to FIG. 3B, UPF data subscription information, which is UPF event subscription information including subscription items for each event, and direct notification indication parameter for direct transmission of event results to the NWDAF may be added to optional input parameters.

FIG. 3C illustrates an example of UPF data subscription information of the SMF event exposure service subscription operation for an indirect UPF event subscription service according to an embodiment of the present disclosure.

Referring to FIG. 3C, in the NWDAF, the UPF data subscription information including subscription item that is measurement target information for each event maybe included as an input parameter of Nsmf_EventExposure_Subscribe Operation.

Referring to FIG. 3C, when the NWDAF request a 'QoS monitoring' event, the subscription item may include at least one of delay measurement (UL, DL, or RTT), the bandwidth measurement (UL, DL, or overall), a packet drop rate (UL or DL), or the number of transmitted packets (UL or DL).

Referring to FIG. 3C, when the NWDAF requests a 'UserDataUsageMeasures' event, the subscription item may include at least one of volume measurement (data volume (UL, DL, or overall)), the number of packets exchanged (UL, DL, or overall), or throughput measurement (UL or DL) and when the NWDAF request the 'UserDataUsageTrends' event, the subscription item may include at least one of throughput statistical measurement (average or peak throughput).

Figure 4A:
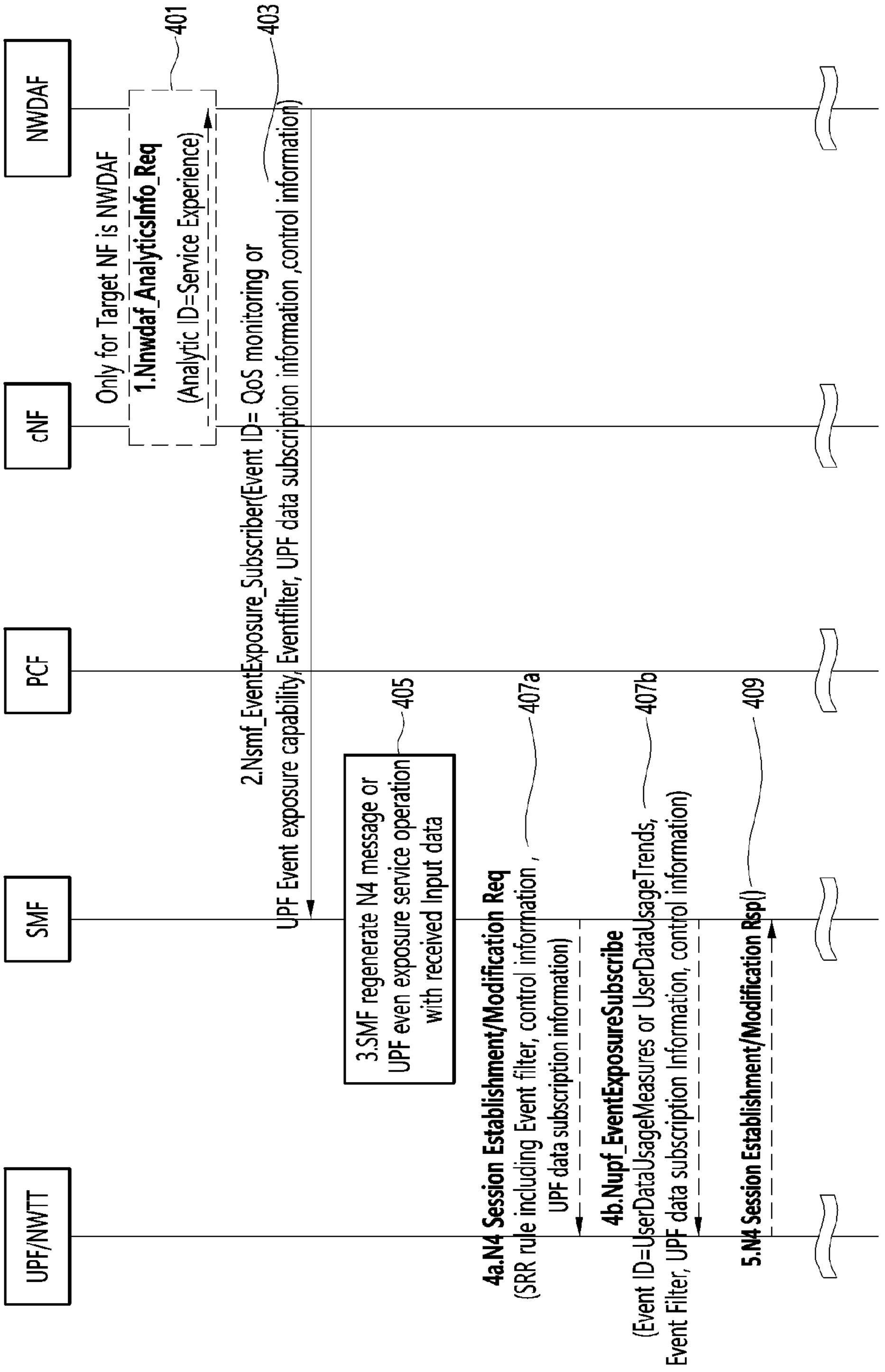
FIGS. 4A and 4B illustrate an example of an indirect UPF event exposure service procedure between an NWDAF and a UPF using the SMF event exposure service according to an embodiment of the present disclosure.
Figure 4B:
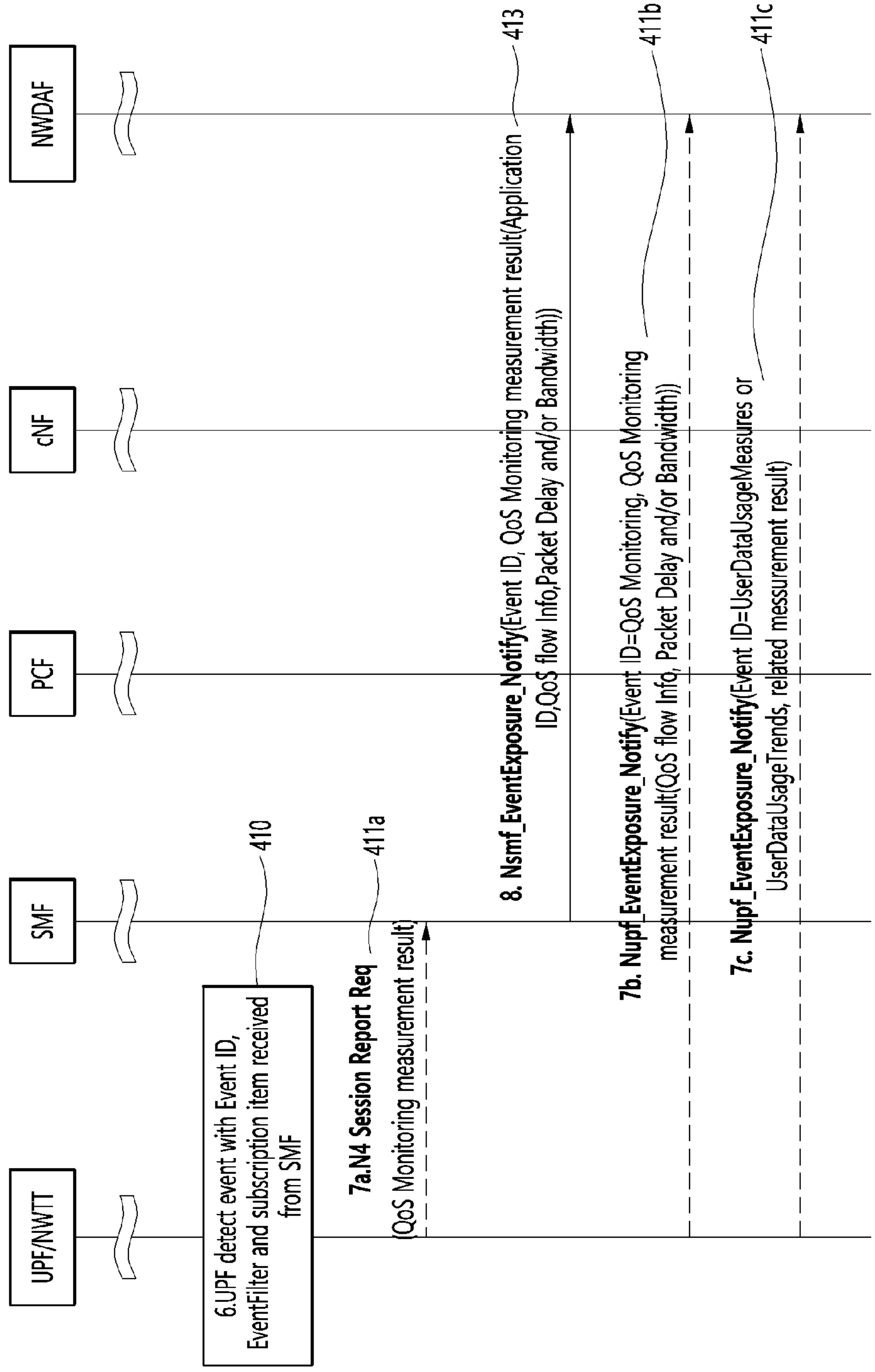

FIGS. 4A and 4B illustrate an example of an indirect UPF event exposure service procedure between the NWDAF and UPF using the SMF event exposure service according to an embodiment of the present disclosure.

Referring to FIGS. 4A and 4B, the NWDAF may request indirect UPF event subscription through an SMF event exposure service to the SMF. According to one embodiment, UPF event may be one of 'QoS monitoring', 'UserDataUsageMeasures', or 'UserDataUsageTrends'.

The SMF may perform final subscription of a 'QoS monitoring' event to the UPF through an N4 interface or may perform final subscription of a 'UserDataUsageMeasures' or 'UserDataUsageTrends' event to the UPF through an Nupf SBI with subscription information received from the NWDAF.

When a subscribed event is occurred, the UPF directly transmits the event result to the NWDAF.

Referring to FIGS. 4A and 4B, the NWDAF may receive a specific request for application of UE from cNF at 401. At the operation 401, the request from the cNF may include at least one of DNN, S-NSSAI, a subscription permanent identifier (SUPI), the application ID, and QoS flow information in the cNF.

When receiving this, the NWDAF may find the serving SMF of the UE and then may request the UPF event subscription to the SMF through Nsmf_EventExposure_subscribe service operation at 403. According to one embodiment, the events may be one of 'QoS monitoring', 'UserDataUsageMeasures', or 'UserDataUsageTrends'.

At an operation 403, the NWDAF may include Event ID, an event filter and input parameters for each UPF event. According to one embodiment, an event ID and a target of event reporting is a mandatory input parameter. Here, the target of event reporting may indicate at least one of a PDU session ID, UEID and an internal group identifier. At the operation 403, corresponding UPF event ID, event filter information is defined in FIG. 3A and the UPF data subscription information which is an input parameter defined in FIG. 3C. According to one embodiment, the UPF data subscription information may include the subscription item, which is measurement target information.

For each UPF event ID, the event filter may include at least one of SUPI, DNN, S-NSSAI, the application ID, the monitoring type, QoS flow information, the area of interest (AoI), or the SSID/BSSID, which is described in FIG. 3A. the monitoring type indicates which information to be monitored for the event and the monitoring type may include at least one of the packet delay measurement or the bandwidth measurement. The packet delay measurement may be at least one of UL delay, DL delay, or RTT delay. The bandwidth measurement may be at least one of UL traffic volume, DL traffic volume, or overall traffic volume. The QoS flow information may include at least one of the IP filter set or the Ethernet filter set as filter information for the SMF to find a QFI (QoS flow identifier) of a corresponding QoS flow within a specific PDU session. the monitoring type and packet numbers may also be transmitted from the NWDAF to the SMF through subscription information as an input parameter, not included in the event filter.

When the NWDAF requests a 'QoS monitoring' event, the subscription item (i.e. measurement target information) of the UPF data subscription information, may include at least one of delay measurement (e.g., UL, DL, or RTT), bandwidth measurement (e.g., UL, DL, or overall), packet drop rate(e.g., UL or DL), or packet transmission number (e.g., UL or DL).

When the NWDAF requests the 'UserDataUsageMeasures' event, the subscription item (i.e. measurement target information) of the UPF data subscription information, may include volume measurement (e.g., data volume (UL, DL, or overall), the number of packets exchanged (UL, DL, or overall)), or throughput measurement(UL or DL) and when the NWDAF requests the 'UserDataUsageTrends' event, the subscription item(i.e. measurement target information) of the UPF data subscription information may include throughput statistical measurement (e.g., average or peak throughput).

After that, the SMF regenerates a UPF subscription message or service operation based on information received from the NWDAF according to a requested event at 405.

When an event ID received from the NWDAF is 'QoS monitoring', the SMF may generate a session report rule (SRR) with the information received from the NWDAF which are the event filter, UPF data subscription information and control information (a notification target address (+Notification correlation ID, direct notification indication). The generated SRR may be transmitted to the UPF by using the N4 session establishment request or N4 session modification request through the N4 interface at 407*a*.

When the event ID received from the NWDAF is 'UserDataUsageMeasures' or 'UserDataUsageTrends', the SMF may generate an Nupf_EventExposure_Subscribe service operation with the information which are the event filter, and UPF data subscription information, and control information(a notification target address (+Notification correlation ID), direct notification indication). The generated Nupf_EventExposure_Subscribe service operation may be transmitted to the UPF through the SBI at 407*b*.

Subsequent operations may refer to FIG. 4B.

The UPF may monitor user data by detecting the occurrence of a corresponding event with the event ID, the event filter, the UPF data subscription information, control information received through the N4 interface or an Nupf service interface from the SMF at 410.

Afterwards, when 'QoS monitoring' event is detected and control information is not received from the SMF, the UPF may transmit the event results to the SMF through an N4 session report request at 411*a*.

When receiving this, the SMF may transmit the event results to the NWDAF through Nsmf_EventExposure_Notify at 413.

When 'QoS monitoring' event is detected and the control information is received from the SMF, and the direct notification indication included in the control information is 'on', the event result may be directly transmitted through an Nupf_EventExposure_Notify service operation to the NWDAF at 411*b*.

Meanwhile, 'UserDataUsageMeasures' or 'UserDataUsageTrends' is detected, the UPF may directly transmit the event result through Nupf_EventExposure_Notify service operation to the NWDAF at 411*c*.

Throughout the present specification, the subscription item included in UPF data subscription information may have the same meaning as measurement target information or a type of measurement.

Figure 5:
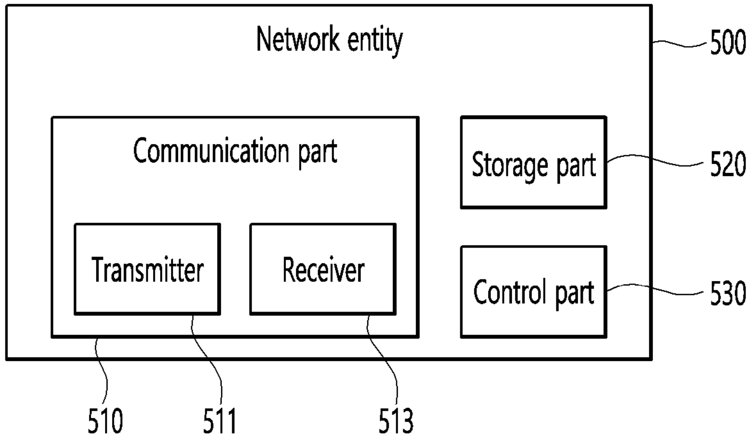
FIG. 5 illustrates the configuration of a network entity in a wireless communication system according to various embodiments of the present disclosure.

FIG. 5 illustrates the configuration of a network entity in a wireless communication system according to various embodiments of the present disclosure.

The network entity of the present disclosure is a concept including a network function according to system implementation. Terms such as "~part" and "~device" used below refer to a unit that processes at least one function or operation, which may be implemented by hardware or software, or a combination of hardware and software. The network entity 500 according to various embodiments of the present disclosure may include a communication part 510, a storage part 520, and a control part 530 that controls the overall operation of the network entity 500. The communication part 510 transmits and receives signals with other network entities. Accordingly, all or part of the communication part 510 may be referred to as "a transmitter 511", "a receiver 513" or "a transceiver 510". The storage part 520 stores data such as a basic program, an application program, and setting information for the operation of the network entity 500. The storage part 520 may consist of volatile memory, non-volatile memory, or a combination of volatile and non-volatile memories. In addition, the storage part 520 provides stored data according to the request of the control part 530. The control part 530 controls overall operations of the network entity 500. For example, the control part 530 transmits and receives signals through the communication part 510. In addition, the control part 530 writes data in the storage part 520 and reads the data. In addition, the control part 530 may perform the functions of protocol stack required by communication standards. To this end, the control part 530 may include a circuit, an application-specific circuit, at least one processor, or microprocessor, or may be part of a processor. In addition, a part of the communication part 510 and the control part 530 may be referred to as a communication processor (CP). The control part 530 may control the network entity 500 to perform any one operation among various embodiments of the present disclosure. The communication part 510 and the control part 530 do not necessarily have to be implemented as separate modules, but may be implemented as a single component in the form of a single chip or software block. The communication part 510, the storage part 520, and the control part 530 may be electrically connected to each other. In addition, operations of the network entity 500 may be realized by including the storage part 520 storing a corresponding program code in the network entity 500. The network entity 500 may include a network node, and may be any one of network functions illustrated in FIG. 1.

According to various embodiments of the present disclosure, a method performed by a session management function (SMF) for providing an UPF event exposure service for a user data monitoring in a 5G system (5GS) may include a process in which the SMF receives a UPF event subscription request through service based interface (SBI) from NWDAF including at least one of the event ID, the event filter applied to the event, the UPF data subscription information, or the control information(a notification target address (+Notification correlation ID, direct notification indication) for directly transmitting an event result to the NWDAF through the SBI; a process in which the SMF regenerates a UPF event subscription message or service operation on the basis of the event ID, the event filter information, the UPF data subscription information, and the control information received from the NWDAF; and a process in which the SMF transmits the regenerated UPF event subscription message or service operation through the N4 interface or Nupf_EventExposure service interface to the UPF.

According to one embodiment, the SBI through which the SMF receives the UPF event subscription request from the NWDAF is Nsmf_EventExposure service interface.

According to one embodiment, the UPF event ID the SMF receives from the NWDAF includes at least one of 'QoS monitoring', 'UserDataUsageMeasures', or 'UserDataUsageUsageTrends' events.

According to one embodiment, the event filter the SMF receives from the NWDAF includes at least one of DNN, S-NSSAI, the application ID, the area of interest (AoI), SSID, BSSID, or target QoS flow information for monitoring on a per QoS flow basis.

According to one embodiment, the target QoS flow information may include at least one of an IP filter set or an Ethernet filter set.

According to one embodiment, the UPF data subscription information includes a subscription item, which is measurement target information for the event.

According to one embodiment, the event ID may include the 'QoS monitoring' event, and the subscription item may include at least one of the delay measurement, the bandwidth measurement, a packed drop rate, or the number of transmitted packets.

According to one embodiment, the delay measurement may include at least one of UL delay, DL delay, or RTT delay, and the bandwidth measurement may include at least one of the UL bitrate or the DL bitrate.

According to one embodiment, the event ID may include the 'UserDataUsageMeasures' event, and the subscription item may include at least one of volume measurement or throughput measurement.

According to one embodiment, the volume measurement may include at least one of UL data volume or DL data volume, and the throughput measurement may include at least one of UL data throughput or DL data throughput for a specific PDU session or application.

According to one embodiment, the event ID may include the 'UserDataUsageTrends' event, and the subscription item may include throughput statistic measurement.

According to one embodiment, the throughput statistic measurement may include at least one of average throughput or peak throughput for the specific PDU session or application.

According to one embodiment, the control information includes at least one of notification target address (+Notification correlation ID), or the direct notification indication.

According to various embodiments of the present disclosure, the session management function (SMF) for providing the UPF event exposure service for user data monitoring in a wireless communication system includes a transceiver, and a control part operably connected to the transceiver, wherein the control part may receive a UPF event subscription request through a service based interface (SBI) from the network data analysis function (NWDAF) including at least one of an event ID, an event filter information applied to the event, UPF data subscription information, or control information(a notification target address (+Notification correlation ID, direct notification indication) for directly transmitting an event result to the NWDAF, may regenerate the UPF event subscription message or service operation on a basis of the event ID, the event filter information, the UPF data subscription information, and the control information, and may transmit the regenerated UPF event subscription message or service operation through an N4 interface or a Nupf_EventExposure service interface to the UPF.

According to one embodiment, wherein the SBI through which the SMF receives the UPF event subscription request from the NWDAF is a Nsmf_EventExposure service.

According to one embodiment, wherein the UPF event ID includes at least one of events of QoS monitoring, UserDataUsageMeasures, or UserDataUsageTrends.

According to one embodiment, wherein the event filter information includes at least one of a data network name (DNN), single-network slice selection assistance information (S-NSSAI), an application ID, an area of interest (AoI), SSID or BSSID, or QoS flow information.

According to various embodiments of the present disclosure, a method performed by the user plane function (UPF) for providing the UPF event exposure service for user data monitoring in a wireless communication system may include receiving the UPF event subscription message or service operation through the N4 interface or the Nupf_EventExposure service interface from session management function (SMF) including at least one of an event ID, the event filter information, the UPF data subscription information, or control information(a notification target address (+Notification correlation ID, direct notification indication) for directly transmitting the event result to the NWDAF, performing event monitoring on the basis of the UPF event subscription information, and transmitting the event result to the NWDAF when the event occurs.

According to one embodiment, when the ‘QoS monitoring’ event is occurred and control information is received and direct notification indication is ‘on’ in the received information, the event result may be transmitted to the NWDAF directly through Nupf_Event exposure service interface to the NWDAF.

According to one embodiment, when the ‘QoS monitoring’ event is occurred and there is no control information in the received information, the event result may be transmitted to the SMF through the N4 session report request.

According to one embodiment, when the user data monitoring event subscribed is ‘UserDataUsageMeasures’ or ‘UserDataUsageTrends’, the event result may be transmitted to NWDAF directly through the Nupf_EventExposure service interface.

According to various embodiments of the present disclosure, the user plane function (UPF) for providing the UPF event exposure service for user data monitoring in a wireless communication system includes the transceiver, and the control part operably connected to the transceiver, wherein the control part may receive the UPF event subscription message or service operation through the N4 interface or Nupf_EventExposure service interface from the session management function(SMF) including at least one of the event ID, event filter information, the UPF data subscription information, or the control information(a notification target address (+Notification correlation ID, direct notification indication) for directly transmitting the event result to the NWDAF, may perform event monitoring on the basis of the UPF event subscription information, and may transmit an event result through a Nupf_EventExposure service interface to the NWDAF when an corresponding event occurs.

According to one embodiment, when the ‘QoS monitoring’ event is occurred and the control information is received and direct notification indication is ‘on’ in the received information, the control part may transmit the event result to the NWDAF directly through Nupf_Event exposure service interface to the NWDAF.

According to one embodiment, when the ‘QoS monitoring’ event is occurred and there is control information in the received information, the control part may transmit the event result to the SMF through the N4 session report request.

According to one embodiment, when the ‘UserDataUsageMeasures’ or ‘UserDataUsageTrends’ is occurred, the control part may transmit directly the event result to the NWDAF through the Nupf_EventExposure service interface.

Methods according to embodiments described in the claims or specifications of the present disclosure may be implemented in the form of hardware, software, or a combination of hardware and software.

When implemented in software, a computer readable storage medium storing one or more programs (software modules) may be provided. One or more programs stored in a computer-readable storage medium are configured for execution by one or more processors in an electronic device. One or more programs include instructions for enabling an electronic device to execute methods according to embodiments described in claims or specifications of the present disclosure.

Such programs (software modules, software) may be stored in random access memory, non-volatile memory including flash memory, read only memory (ROM), electrically erasable programmable ROM (EEPROM), a magnetic disc storage device, compact disc-ROM (CD-ROM), digital versatile discs (DVDs), other types of optical storage devices, or magnetic cassettes. Alternatively, such programs may be stored in memory configured as the combination of some or all thereof. In addition, each configuration memory may include multiple configuration memories.

In addition, a program may be stored in an attachable storage device that can be accessed through a communication network such as internet, an intranet, a local area network (LAN), a wide area network (WAN), and a storage area network (SAN), or a communication network configured as a combination thereof. Such a storage device may access a device performing an embodiment of the present disclosure through an external port. In addition, a separate storage device in a communication network may access a device performing an embodiment of the present disclosure.

In the specific embodiments of the present disclosure described above, components included in the disclosure are expressed as singular or plural components according to the specific embodiments presented. However, singular or plural expressions are selected appropriately for the presented situation for convenience of explanation, and the present disclosure is not limited to a singular or plural number of components. Even components expressed in a plural number may include a singular component or even a component expressed in a singular number may include a plural number of components.

Meanwhile, although specific embodiments have been described in the detailed description of the present disclosure, various modifications are possible without departing from the scope of the present disclosure. Therefore, the scope of the present disclosure should not be limited to the described embodiments, but should be determined by not only the scope of the claims to be described later, but also scopes equivalent to the scope of the claims.

What is claimed is:

1. A method performed by a session management function (SMF) for providing a user plane function (UPF) event exposure service for user data monitoring in a wireless communication system, the method comprising:

receiving a UPF event subscription request through a service based interface (SBI) from network data analysis function (NWDAF) including at least one of an event ID, an event filter information applied to an event, UPF data subscription information, or control information for directly transmitting an event result to the NWDAF through the SBI;

regenerating the UPF event subscription message or service operation on a basis of the event ID, the event filter information, the UPF data subscription information, and the control information; and transmitting the regenerated UPF event subscription message or service operation through an N4 interface or an Nupf_EventExposure service interface to the UPF.

2. The method of claim 1, wherein the SBI through which the SMF receives the UPF event subscription request from the NWDAF is a Nsmf_EventExposure service.

3. The method of claim 1, wherein the UPF event ID includes at least one of events of QoS monitoring, UserDataUsageMeasures, or UserDataUsage Trends.

4. The method of claim 1, wherein the event filter information includes at least one of a data network name (DNN), single-network slice selection assistance information (S-NS- SAI), an application ID, an area of interest (AoI), SSID or BSSID, or QoS flow information.

5. The method of claim 4, wherein the QoS Flow information includes at least one of an IP filter set or an Ethernet filter set.

6. The method of claim 1, wherein the UPF data subscription information includes a subscription item which is measurement target information for the event.

7. The method of claim 6, wherein the event ID includes a QoS monitoring event, and the subscription item includes at least one of delay measurement, bandwidth measurement, a packed drop rate, or the number of transmitted packets.

8. The method of claim 7, wherein the delay measurement includes at least one of UL delay, DL delay, or round trip time (RTT) delay, and the bandwidth measurement includes at least one of a UL bitrate or a DL bitrate.

9. The method of claim 6, wherein the event ID includes a UserDataUsageMeasures event, and the subscription item includes at least one of volume measurement or throughput measurement.

10. The method of claim 9, wherein the volume measurement includes at least one of UL data volume, DL data volume, or overall data volume, and the throughput measurement includes at least one of UL data throughput or DL data throughput for a specific PDU session or application.

11. The method of claim 6, wherein the event ID includes a UserDataUsageTrends event, and the subscription item includes throughput statistic measurement.

12. The method of claim 11, wherein the throughput statistic measurement includes at least one of average throughput, or peak throughput for a specific PDU session or application.

13. The method of claim 1, wherein the control information includes at least one of a notification target address, a correlation ID, or direct notification indication.

14. A session management function (SMF) for providing a user plane function (UPF) event exposure service for user data monitoring in a wireless communication system, the SMF comprising:

a transceiver, and a control part operably connected to the transceiver, wherein the control part is configured to:

receive a UPF event subscription request through a service based interface (SBI) from the network data analysis function (NWDAF) including at least one of an event ID, an event filter information applied to the event, UPF data subscription information, or control information for directly transmitting an event result to the NWDAF;

regenerate the UPF event subscription message or service operation on a basis of the event ID, the event filter information, the UPF data subscription information, and the control information; and transmit the regenerated UPF event subscription message or service operation through an N4 interface or a Nupf_EventExposure service interface to the UPF.

15. The SMF of claim 14, wherein the SBI through which the SMF receives the UPF event subscription request from the NWDAF is a Nsmf_EventExposure service.

16. The SMF of claim 14, wherein the UPF event ID includes at least one of events of QoS monitoring, UserDataUsageMeasures, or UserDataUsage Trends.

17. The SMF of claim 14, wherein the event filter information includes at least one of a data network name (DNN), single-network slice selection assistance information (S-NSSAI), an application ID, an area of interest (AoI), SSID or BSSID, or QoS flow information.

18. A method performed by a user plane function (UPF) for providing an UPF event exposure service for user data monitoring in a wireless communication system, the method comprising:

receiving an UPF event subscription message or service operation through an N4 interface or an Nupf_EventExposure service interface from a session management function (SMF), and transmitting directly the event result through a Nupf_EventExposure service interface to network data analysis function (NWDAF), when the event occurs, wherein the UPF event subscription message or service operation includes at least one of an event ID, an event filter information, UPF data subscription information, or control information for directly transmitting an event result to the NWDAF.

19. A user plane function (UPF) for providing an UPF event exposure service for user data monitoring in a wireless communication system, the UPF comprising:

a transceiver; and a control part operably connected to the transceiver, wherein the control part is configured to:

receive an UPF event subscription message or service operation through an N4 interface or a Nupf_EventExposure service interface from a session management function (SMF); and transmit directly the event result through a Nupf_EventExposure service interface to network data analysis function (NWDAF), when the event occurs, wherein the UPF event subscription message or service operation includes at least one of an event ID, event filter information, UPF data subscription information, or control information for directly transmitting an event result to the NWDAF.

* * * * *